Feb. 5, 1946.   A. C. LAYTON   2,393,996
METHOD OF DETECTING FLAWS
Filed Oct. 31, 1944
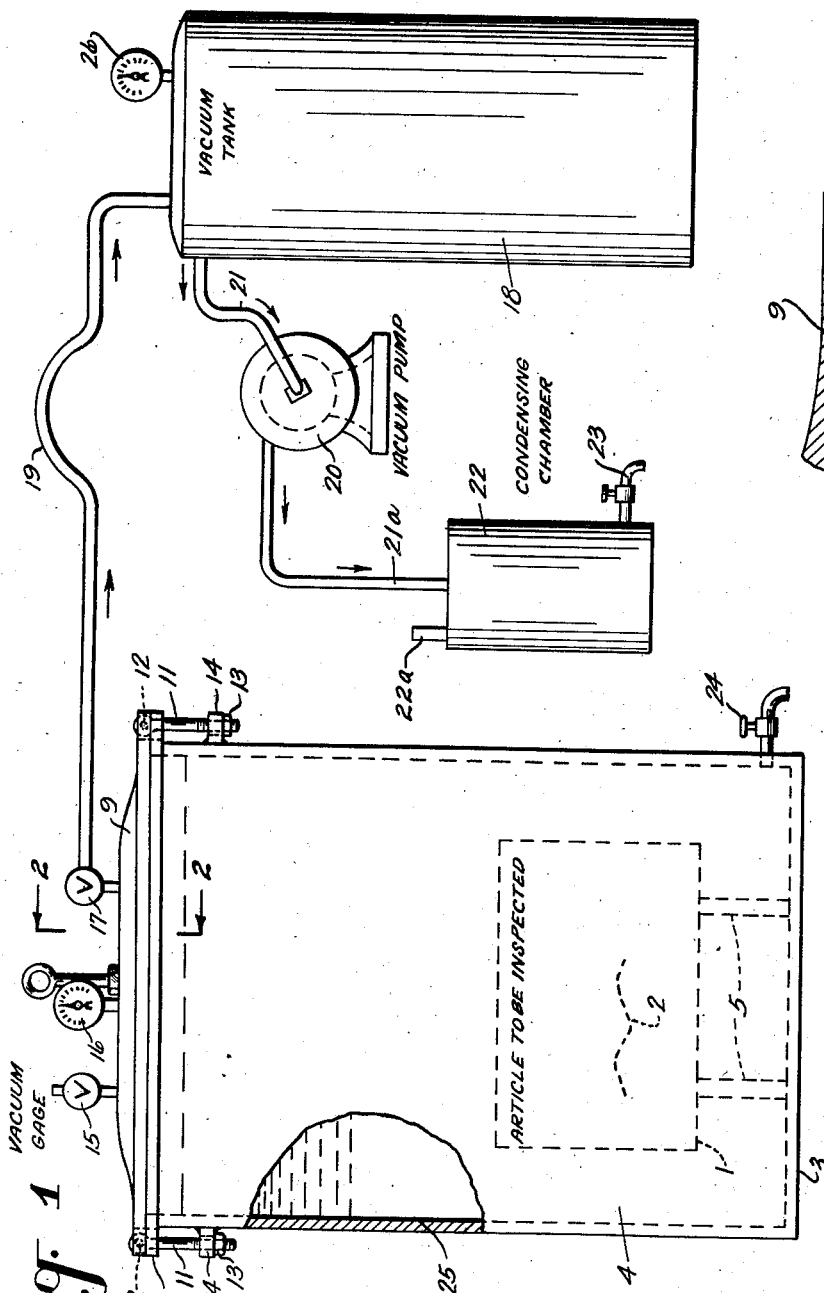
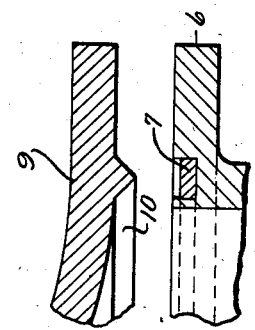
INVENTOR.
ARTHUR C. LAYTON

Patented Feb. 5, 1946

2,393,996

UNITED STATES PATENT OFFICE

2,393,996

METHOD OF DETECTING FLAWS

Arthur C. Layton, Dallas, Tex.

Application October 31, 1944, Serial No. 561,250

4 Claims. (Cl. 73—104)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in methods of detecting flaws in rigid metallic or nonmetallic bodies, and more particularly, the invention relates to simple, rapid and nondestructive inspection means for determining the location of cracks, seams or other defects in the surface of rigid bodies.

An object of the present invention is the practice of a method of applying an inspection liquid to the surface of a structural part to be inspected, causing the liquid to be retained in and adjacent any breaks in the surface where it may be observed during the inspection of the part.

A further object is the practice of a method for subjecting the article or part to be inspected to a subatmospheric pressure and applying an inspection liquid to the part while under the subatmospheric pressure so as to withdraw air or foreign matter from the defects or flaws in the article and then applying pressure to the liquid to force the same into the defects to prevent the removal of the liquid from the defective area during the removal of the inspection liquid from the surface of the article, and applying suction to the article after cleaning to withdraw the inspection liquid from the flaws or defects to the surface where it may be visible for locating the defects.

In prior art, various attempts have been made to develop a simple and effective inspection method and apparatus for disclosing minute flaws, surface cracks, etc., in articles. It has been proposed to cover the surface of the article or part to be tested with a suitable inspection liquid, and, after applying pressure to the surface of the liquid, to remove the liquid from the article, cleaning the surface thoroughly so that the inspection liquid forced into the defective area will be visible after the cleaning operation. In practice, this method has not been found to be entirely satisfactory because the inspection liquid either does not enter or is not retained in the small flaws, very fine cracks, or other defects in the part being inspected when the pressure is removed from the inspection liquid. Upon cleaning of the article, the inspection liquid is therefore removed from the defective area.

Applicant, on the other hand, by first subjecting the liquid surrounding the tested part to a subatmospheric pressure, withdraws any air or gaseous material from the flaw or defect so that when normal atmospheric pressure is applied to the liquid the liquid will be free to enter the defects regardless of how minute they may be. After the article has been removed from the testing liquid and cleaned the liquid in the fine flaws or cracks does not come to the surface until the part to be inspected is again subjected to subatmospheric pressure. This suction causes the inspection liquid to be drawn to the surface where it becomes visible.

Other objects and advantages of the invention will become apparent from the following description taken in connection with the accompanying drawing in which like reference characters refer to like parts in the several figures.

Fig. 1 is a side elevation of my improved apparatus for carrying out my invention, parts of which are broken away and shown in section.

Fig. 2 is an enlarged fragmentary detail view of a portion of the vessel or container and its cover for applying the liquid and pressures to the surface of the article to be tested, showing more particularly the sealing means between the vessel and its cover.

In the drawing, the numeral 1 indicates an article or part to be tested or inspected, having a flaw or crack 2 therein. The article is suitably supported in spaced relation to the bottom 3 of a liquid container or chamber 4, by blocks or standards 5.

The container 4 is provided with an upper sealing flange 6 formed with an annular groove or channel 7 in which is disposed an annular sealing gasket 8. The gasket may be of lead, rubber, or any suitable sealing material. A removable closure or cover 9 is provided, having an annular V-shaped rim or lip 10 for closing the top of the container 4, with the lip in contact with the gasket member 8 in the groove 7 of the flange portion 6. Suitable clamping means, in the form of tie bolts 11, may be provided, pivoted in notches 12 formed in the peripheral edge of the cover in registration with suitable notches in the peripheral portion of the flange 6. The bolts may be provided with tightening means or nuts 13 for engagement with bifurcated brackets 14 carried by the outer surface of the testing container 4. The cover in most instances will seat on the gasket 8 sufficiently tight so that the use of auxiliary means such as the tie bolts 11 are unnecessary.

The cover 9 is provided with an air inlet control valve 15, a pressure or vacuum gage 16, and a suction or subatmospheric pressure control valve 17. This valve 17 is connected to a closed container or vacuum tank 18 by a flexible pipe or conduit 19. The closed container 18 is connected to a vacuum pump 20 by a suction conduit 21, the exhaust or discharge side of the pump 20 being connected by a conduit 21a to the receiver 22. The receiver 22 is designed to receive any condensed vapors withdrawn from containers 18 and 4, and is provided with a drain valve 23 for emptying the condensed vapors therefrom, and an unvalved vent pipe for maintaining atmospheric pressure in the receiver 22 at all times.

The test container 4 is preferably filled substantially to the top with the inspection liquid 25 and is provided with discharge valve 24 for emptying the inspection liquid from the container or vessel 4 so that the part to be inspected may be removed, cleaned and replaced in the empty container 4 and again subjected to suction and atmospheric pressure. The vacuum tank 18 provides means for suddenly exhausting the air from the container 4 when the valve 17 is opened in order to create a vacuum in the container 4 in the shortest possible time. When the valve 17 is opened, a sudden reduction in pressure on the surface of the liquid inspection fluid will produce a sudden reduction of pressure within the flaws, and by this means any water or other liquid present within the flaws will flash into vapor with mildly explosive violence, thus forcing dirt and foreign matter from the defect. The vacuum tank 18 may be supplied with a suitable pressure gage 26 to indicate the degree of vacuum in this tank.

While any type of suitable inspection liquid may be used in the container 4, it is desirable to employ a highly colored liquid, preferably having fluorescent characteristics, such as a solution of fluorescein in propylene glycol, made slightly alkaline. The presence of this liquid on the inspected part when viewed in an ultraviolet light shows up the defects in a bright glow.

Such a liquid will remain stable in a vacuum of 29 inches of mercury. The viscosity of the liquid varies directly as the pressure varies, and when the pressure is sufficiently reduced the liquid will boil at room temperature, at which point the viscosity will approach that of its vapor.

In the operation of the apparatus, the part or article to be inspected is placed in the container 4 on the standards 5, and the testing liquid is introduced into the container so as to completely surround and cover the part to be tested. The cover 9 is then placed on its seat on the top of the container with the air inlet valve 15 closed. With the pump 20 in operation, the suction control valve 17 is opened, reducing the pressure in the container 4 to the degree desired, as indicated by the vacuum indicator on gage 16, and the degree of vacuum within the tank 18, as indicated by the pressure gage 26.

Since it is not desirable that the inspection liquid boil, the reduction in the pressure in the inspection liquid chamber should be stopped just short of the boiling point, which will vary, depending upon the boiling characteristics of the particular inspection liquid employed.

When the part or article to be inspected and surrounded by the liquid, is subjected to the vacuum or suction pressure, the air, moisture, etc., which has penetrated the surface defects, will escape or boil off, rising to the top of the inspection liquid, and will be removed by the evacuating pump 20 and trapped in the condensing chamber or container 22. The viscosity of the inspection liquid being low, due to the reduction of the pressure therein, will permit the liquid to permeate the small cracks or defects. After the reduction of pressure within the container 4, as noted above, the valve 17 is closed and the valve 15 opened to restore atmospheric pressure within the tank, forcing the inspection liquid under this pressure into the defects of the part or article to be inspected. The cover 9 is then removed and the part 1 removed from the liquid and the surface thereof is thoroughly cleaned.

The inspection liquid in the defects or flaws in the article being under a higher pressure now than when it was submerged in the liquid under the suction pressure, the viscosity of the liquid is higher and cannot effectively be removed from the cracks or defects, particularly, where they are very small.

After cleaning, the article again is placed under subatmospheric pressure, this being preferably done in the container 4 by first removing the inspection liquid from the container through the drain valve 24 and then placing the article within the container, replacing the cover and closing the valves 24 and 15 and opening the valve 17 to the vacuum chamber 18, with the pump 22 in operation.

The inspection liquid contained in any of the defects in the article, due to the reduction in pressure, will become less viscous, and will rise to the surface, forming an outline of the defect. It might be noted that higher suction pressure may be applied in this second step, if desired, to bring the inspection liquid closer to its boiling point.

The part 1 to be inspected is now subjected to normal atmospheric pressure and some of the inspection fluid that was withdrawn from the defects in the surface will again reenter these defects, but the greater portion will be spread about the surface adjacent the defects, and the amount left on the surface will be in direct ratio to the depth and extent of the defects. When the part to be inspected is finally removed from the vessel 4 and viewed in the rays of ultraviolet light, if a fluorescent liquid is used, the fluid disposed on the surface adjacent the defects will glow brightly, giving an excellent indication of the scope and extent of the defects in the surface of the part.

While I have disclosed a preferred embodiment of my invention, it is obvious that certain modifications may be made, as, for instance, in the specific apparatus or the type of inspection liquid used, without departing from the spirit of the invention as defined in the appending claims.

I claim:

1. The method of detecting flaws and defects in the surface of an article to be inspected which consists in applying an inspection liquid to the surface of the article which is capable of penetrating flaws therein, subjecting the article to subatmospheric pressure to create a subatmospheric pressure in said flaws while the inspection liquid covers said flaws, increasing the pressure on the article to atmospheric pressure while the inspection liquid covers the flaws, thoroughly cleaning the surface of the article while under atmospheric pressure, again subjecting the article to said subatmospheric pressure after cleaning and while removed from the liquid bath to withdraw the inspection liquid from the flaws, and observing the inspection liquid withdrawn from and surrounding the flaws of the article by said subatmospheric pressure.

2. The method of detecting flaws and defects in the surface of an article to be inspected which consists in applying an inspection liquid to the surface of the article while under a predetermined pressure which is capable of penetrating flaws therein, subjecting the surface of the article to predetermined reduced pressure to create reduced pressure in said flaws while the inspection liquid covers said flaws, increasing the pressure on the article to at least said predetermined pressure, thoroughly cleaning the surface of the article while under the last named predetermined pressure, again subjecting the article to said reduced pressure after cleaning and while removed from the liquid bath to withdraw the inspection liquid from the flaws, and observing the inspection liquid withdrawn from and surrounding the flaws of the article by said reduced pressure.

3. The method of detecting flaws in an article or part to be inspected which comprises submerging the article being inspected below the surface of an inspection liquid to seal the defective surface portions thereof from the atmosphere, subjecting the liquid to suction pressure to reduce the pressure in the existing defects in the surface of the article and to reduce the quantity of any compressible medium, such as air or moisture, in the said defective portions, increasing the degree of pressure on the inspection liquid while the article is submerged therein to force the inspection liquid into the defective portions, removing the article from the inspection liquid, removing the inspection liquid from the outer surface of the article, applying suction pressure to the surface of the article to withdraw the inspection liquid contained in the defects to the surface of the article and around the defects, whereby the presence of the testing liquid on the surface denotes the defective portions.

4. The method of testing the surface of a homogeneous article for flaws therein which comprises covering the surface of the article with a distinguishable inspection liquid having a viscosity which increases with the application of pressure on the liquid, reducing the pressure on the inspection liquid covering the flaws to decrease its viscosity and reduce the pressure of air or foreign matter in the flaws covered by the liquid to cause withdrawal of said air and foreign matter from the flaws through said covering liquid, applying normal atmospheric pressure to the covering liquid to increase its viscosity and cause the same to enter the flaws to replace the air and foreign matter withdrawn therefrom, removing the covering liquid from the surface of the article, and again reducing the pressure on the surface of the article in the vicinity of the flaws to reduce the viscosity of the liquid in the flaws and withdraw the liquid from the flaws onto the surface, whereby the presence of the liquid on the surface of the article denotes the location and extent of the flaws.

ARTHUR C. LAYTON.